J. H. GRAHAM.
PEDAL.
APPLICATION FILED JUNE 21, 1921.
1,432,061.   Patented Oct. 17, 1922.
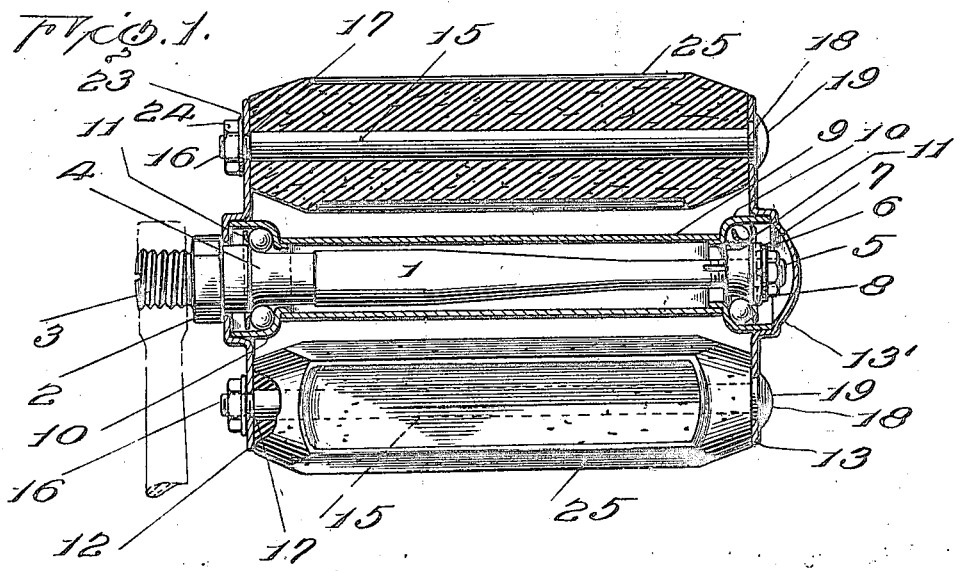
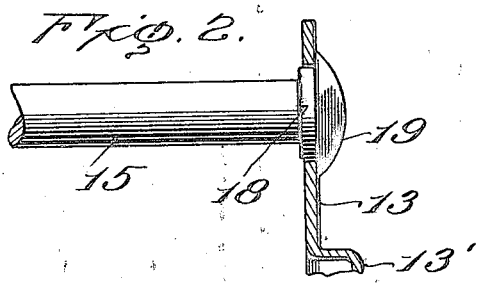
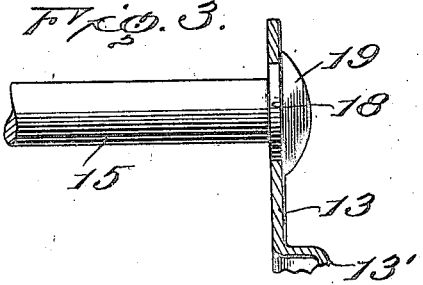
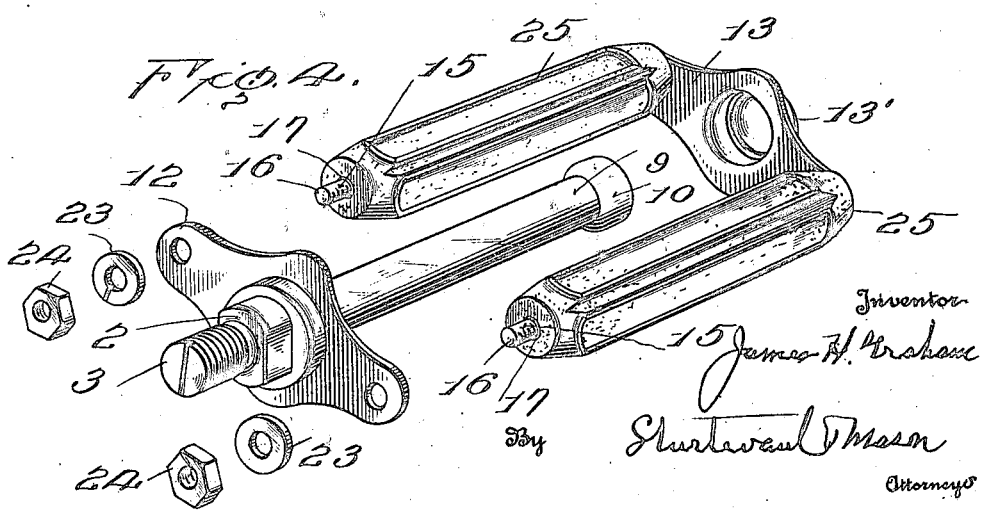
Inventor
James H. Graham
By Sturtevant & Mason
Attorneys Patented Oct. 17, 1922.

1,432,061

UNITED STATES PATENT OFFICE.

JAMES H. GRAHAM, OF TORRINGTON, CONNECTICUT, ASSIGNOR TO THE TORRINGTON COMPANY, OF TORRINGTON, CONNECTICUT, A CORPORATION OF CONNECTICUT.

PEDAL.

Application filed June 21, 1921. Serial No. 479,186.

*To all whom it may concern:*

Be it known that I, JAMES H. GRAHAM, a citizen of the United States, residing at Torrington, in the county of Litchfield, State of Connecticut, have invented certain new and useful Improvements in Pedals, of which the following is a description, reference being had to the accompanying drawing and to the figures of reference marked thereon.

My invention relates to pedals for bicycles and the like.

The object of the invention is to provide a very simple and efficient pedal in which the treadle bolts are integrally or fixedly connected at one end to one end plate and separately connected at their opposite ends to the other end plate, so that one end plate may be removed for the insertion of new rubber treads on the bolts; the bolts, by reason of their rigid connection with the other plate, remaining in fixed position thereon without having to be held manually. This rigid connection of the bolts to one of the end plates eliminates the necessity of nuts and washers at such point, also prevents rotation of the bolts with the liability of the loosening and loss of the nuts, and facilitates the assembling of the parts or renewal of the treads.

This object I accomplish by the construction shown in the accompanying drawings, in which:—

Figure 1 is a sectional elevation of a pedal with my improvement applied;

Fig. 2 is an enlarged detail view showing one of the pedal bolts prior to its being swaged into rigid connection with the end plate;

Fig. 3 is a like view with the bolt rigidly connected to its end plate; and

Fig. 4 shows the parts separated.

The pin 1 is provided at its inner end with a squared collar 2 and screw thread 3 in the usual manner. Adjacent to the inner side of the collar 2 is formed a cone 4. The opposite or outer end of the pin 1 is threaded as at 5, and upon this threaded portion is screwed the cone 6 held from backing off by a washer 7 and nut 8. The sleeve 9 is provided at its ends with cups 10—10, within which are placed the ball carrying cages 11—11, the balls of which run on the cones and cups as usual.

Between the inner cupped end of the sleeve 9 and the collar 2 is placed a tread supporting plate 12. After the inner ball cage 11 is placed in the inner cupped end of the sleeve 9, the sleeve is passed over the pin 1 and then the cone 6 is screwed upon the threaded end 3, after which the washer 8 and nut 7 are placed on the end 3 and so the sleeve 9 is held upon the pin with its cups 10—10, engaging the balls carried by cages 11—11 and the inner tread carrying plate 12 is held in place.

The ends of plate 12 are provided with apertures for the free ends of the tread carrying bolts 15, the opposite ends of said bolts being integrally or permanently affixed to the outer removable plate 13 next to the ends thereof. This plate 13 has its middle portion cupped to form a closed dust cap 13' which closes the outer end of sleeve 9 and so protects the same against the entrance of foreign matter.

It is of great importance that the bolts 15, which carry the rubber or like treads 25, be held in parallelism so that in assembling the parts the inner threaded ends 16 of the bolts may register with and readily pass through the apertures in the ends of the inner plate 12 until stopped by the shoulders 17, after which the locking washers 23 and nuts 24 may be placed on the said threaded ends and so the two plates 12—13 will be rigidly connected.

The bolts 15 are rigidly or integrally connected with the plate 13 by means of an annular shoulder 18 next to the head 19 of the bolt. These shoulders 18 are of less diameter than the holes and are slightly longer than the thickness of plate 13 (see Fig. 2), and suitable swaging devices are employed to swage or compress the surplus material of the shoulders 18 into and over the apertures with sufficient force to permanently unite the bolts to said plate 13.

The bolts 15 and plate 13, therefore, constitute an integral or unitary structure capable of ready removal from the other plate 12 by simply backing off the nuts 24. When so removed, new treads 25 may be placed on the bolts and the parts readily restored to position. The original assembling of the parts is, therefore, greatly facilitated and so also is the renewal of the parts. With the bolts so rigidly united to the plate 13, the cost is lessened as no threading, washers and nuts are required at one end. The compressing or swaging of the shoulder into the aperture of the plate 13 also brings the bolt head firmly up against the outer side of the plate and all chance of relative movement between the plate and bolt is removed. The bolts being fixed, there is no strain tending to back off the nuts at their free inner ends. So also the bolts cannot be pushed through the plate 13 when the treads 25 are being forced upon the bolts as would be the case with loose headed bolts. The two plates 12—13 may be readily separated which would be impossible were both ends of the bolts riveted to the two plates.

In removing the plate 13 with its bolts and the treads, the sleeve 9 and the plate 12 are left in place so that there is no chance of losing the ball bearings. By having the end plates 12—13 cupped to form dust caps, separate dust caps are obviated.

Having thus described the invention, what is claimed as new is:—

1. A bicycle pedal comprising a pin, a sleeve held to turn freely thereon, a plate held on the pin at the inner end of the sleeve, a plate at the outer end of the sleeve separate and independent of said pin, parallel tread carrying bolts fixedly and permanently secured at one end to the ends of one of said plates and threaded at their opposite ends, the ends of the other of said plates having apertures through which the threaded ends of said bolts pass, and nuts on the bolts at the outer side of said plate.

2. In a pedal, a sleeve for the pin, end plates at the ends of the sleeve, parallel tread carrying bolts separately connected at one end to the ends of one plate and integrally and permanently connected at the other end to the other of said plates.

3. In a pedal, a sleeve for the pin having cups at its ends to enclose ball bearings, end plates having integral dust caps closing the cupped ends of the sleeve; one of said cups being apertured for said pin, parallel tread carrying bolts separately connected at one end to one of said plates and integrally and permanently united at their opposite ends to the other of said end plates.

4. A pedal comprising a pin having a shoulder at its inner end and threaded at its outer end, a sleeve loose upon said pin, an end plate on the pin between the said shoulder and the inner end of the sleeve and closing that end of the sleeve, a nut on the outer end of the pin and holding the sleeve thereon, an outer removable end plate closing the outer end of the sleeve, and parallel tread carrying bolts integrally united at one end to the ends of one of said end plates and separately connected at their opposite ends to the ends of the other end plate.

5. In a pedal, two end plates having apertures at their ends, headed tread carrying bolts provided with shoulders at their headed ends swaged into the aperture of one plate to integrally unite them, the opposite ends of the bolts being threaded and provided with nuts to hold the other end plate removably on the bolts.

6. A pedal comprising a pin having a shoulder and cone at its inner threaded end and having a threaded outer end provided with a removable cone, a sleeve having ball cups or cones at the opposite ends, ball bearings between the two pairs of cones, an end plate on the pin between said shoulder and the inner end of the sleeve and provided with an integral dust cap closing the adjacent sleeve cup, an outer removable end plate provided with an integral dust cap closing the outer sleeve cup, and parallel tread carrying bolts integrally connected at one end to the ends of one end plate and separately connected at their opposite ends to the ends of the opposite end plate.

In testimony whereof I affix my signature.

JAMES H. GRAHAM.